H. P. C. BROWNE.
HUB ODOMETER.
APPLICATION FILED OCT. 19, 1910.

1,027,031.

Patented May 21, 1912.

WITNESSES:

INVENTOR

COLUMBIA PLANOGRAPH CO., WASHINGTON, D. C.

UNITED STATES PATENT OFFICE.

HARRY P. C. BROWNE, OF NEW YORK, N. Y.

HUB-ODOMETER.

1,027,031.

Specification of Letters Patent.

Patented May 21, 1912.

Application filed October 19, 1910. Serial No. 587,977.

*To all whom it may concern:*

Be it known that I, HARRY PATRICK CONNOLLY BROWNE, a citizen of the United States, residing at New York, in the county and State of New York, have invented certain new and useful Improvements in Hub-Odometers; and I do hereby declare the following to be a full, clear, and exact description of the invention, such as will enable others skilled in the art to which it appertains to make and use the same.

My present invention relates to improvements in hub-odometers, and is intended to provide a simple and effective device, which may be readily attached to the hub-cap of a vehicle wheel; thus doing away with the necessity of modifying the size and shape of the hub-odometer to suit varying wheel-hub constructions, which necessity exists where the hub-odometer is applied directly to the wheel-hub.

My invention is especially intended to provide a simplified and improved apparatus over that shown in my Patent No. 827,614, granted July 31st, 1906, and entitled Revolution counter; and over that shown in my Patent No. 942,883, granted December 14th, 1909, and entitled Hub-odometer.

My invention will be understood by reference to the accompanying drawings, in which the same parts are indicated by the same letters throughout the several views.

Figures 1, 3:
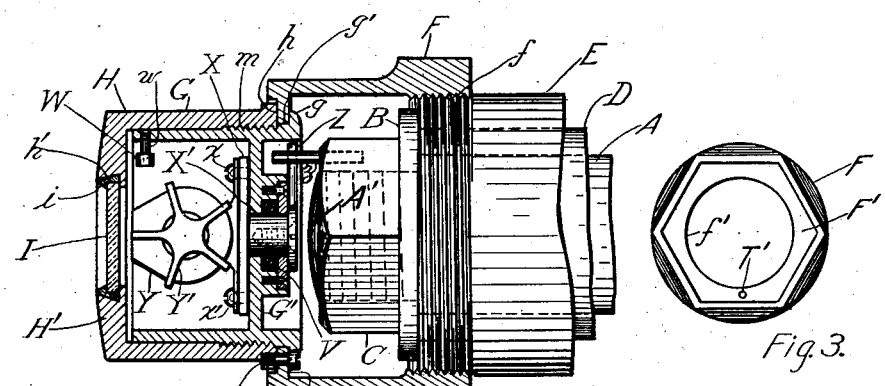
Figure 2:
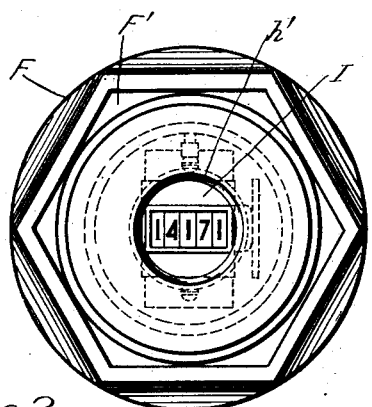
Figures 4, 5:
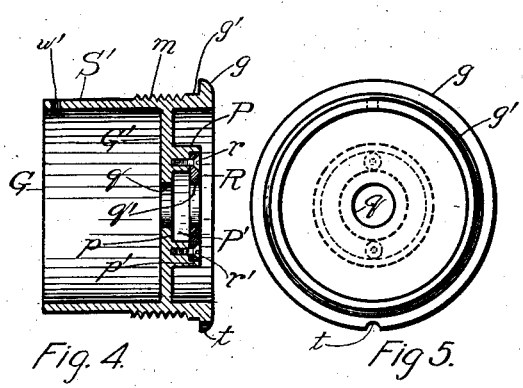
Figure 6:
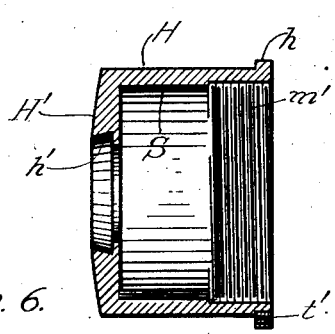
Figure 7:
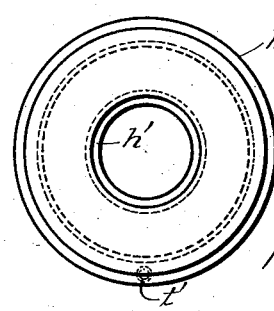

Figure 1 shows a central vertical section through the hub cap and hub-odometer; the wheel hub, bearing, axle and retaining nut being shown assembled in elevation. Fig. 2 is an end view of the device shown in Fig. 1, as seen from the left of said figure. Fig. 3 shows an end elevation on a reduced scale, of the hub cap shown in Fig. 1 and viewed from the left thereof. Figs. 4 and 5 show respectively a central section and end elevation, looking from the left, of the member in which the counting mechanism is mounted. Figs. 6 and 7 show respectively a central vertical section and end elevation, viewed from the left, of the external housing of the device.

A, in Fig. 1, represents the bearing portion of the shaft or axle, which is reduced, as at A', and is screw-threaded as indicated by dotted lines. Over the reduced portion A', the washer B is mounted, which is held in place by the nut C.

D represents a cylindrical bearing bushing mounted between the axle A and the hub E. Screwed on the hub E, is the hub-cap F, which has internal screw threads provided for this purpose as indicated by $f$. At its outer end F is provided with a wall F', which is ordinarily intended to inclose and protect the hub mechanism from dust, but which, for the purposes of this invention, is provided with a large hole $f'$, Fig. 3, co-axial with the hub cap, and adapted to receive the piece G. The piece G, shown in detail in Figs. 4 and 5, is substantially in the form of a hollow cylinder having an external flange $g$ and a circumferential seat $g'$, at its inner end; and being closed at substantially its inner end by the wall G'. The seat $g'$ is adapted to fit within the hole $f'$, and the flange $g$ is adapted to locate the piece G longitudinally with respect to the wall F' of the hub cap. The piece G is provided on its outer cylindrical surface with a male screw thread, indicated by the letter $m$, running outwardly from the seat $g'$. The piece H, shown in detail in Figs. 6 and 7, is, also, substantially in the form of a hollow cylinder, closed at its outer end by a wall H' and the glass window I set in the aperture $h'$ with cement or other suitable material, as indicated by the letter $i$. At its inner end H is provided with a female screw thread $m'$, corresponding with the screw thread $m$ which it engages. The plain internal cylindrical surface S of the piece H is adapted to fit snugly over the plain external cylindrical surface S' of the piece G; thus positioned, the pieces G and H are drawn together by the engagement of the screw threads $m$ and $m'$, until the flange $g$ and the flange $h$ press against the inner and outer sides, respectively, of the wall F' of the hub cap F. In this relation the pieces G and H, and the hub cap F are locked by the screw T, for the accommodation of which, the hole T' is provided in the wall F', Fig. 3, and the notch $t$ and the tap $t'$ in pieces G and H respectively, shown in Figs. 5 and 7.

The wall G' of the piece G, Fig. 3, has formed on the inner side thereof, the centrally disposed boss P, which is centrally counterbored as indicated by the letters $p$ and $p'$. The circular plate R is adapted to fit in the counterbore $p'$, and be fastened therein by the small screws $r$ and $r'$; an annular space P', is thus provided for the reception of the packing V, shown in Fig. 1, and to be referred to hereinafter. Holes $q$ and $q'$ are centrally disposed in the plate R and the wall G', respectively, and are of equal diameters.

Referring now to Fig. 1, X is a rectangular plate, on the inner face of which is the centrally disposed spindle X', formed integrally with the plate X. On the outer face of X, the counting mechanism or cyclometer Y is centrally mounted and fastened by the screws $x$ and $x'$. The spindle X' is journaled in the holes $q$ and $q'$, Fig. 4, and has secured to its outer end the radial arm Z by means of which it is retained in its proper position in the journals provided by the holes $q$ and $q'$. Z is prevented from turning through a complete revolution by its contact with the stop pin $z$ mounted in the nut C. The striker W, carried by the pin $w$ mounted on the piece G, in the tapped hole $w'$, Fig. 3, is adapted to engage the teeth Y' of the cyclometer Y, in succession as the piece G revolves with the wheel hub. V, Fig. 1, is a packing of any suitable material disposed in the annular space P', Fig. 4, and is adapted to exclude oil or other matter contained in the hub cap, from entering the cyclometer compartment.

From an examination of Fig. 1, it will be noted that the cyclometer is held against rotation by the stop pin $z$ and the arm Z while the hub revolves, causing the striker W, at each revolution of the hub, to strike one tooth of the cyclometer star wheel, and thus to indicate the revolutions of the hub E.

With reference to the special intention of my invention, hereinbefore adverted to, it will be noted that the operating parts of the hub-odometer are, with the exception of the pin $z$, completely contained in the piece G. This feature permits of correct assembly and adjustment of the operating parts into a complete instrument; applicable without necessity of change or alteration and with a minimum of expense and time and in a substantial manner, to any vehicle provided with a hub cap in which the piece G can be seated substantially as shown in Fig. 1, but without reference to any other detail of hub construction.

It will be obvious that various modifications might be made in the herein-described apparatus which could be used without departing from the spirit of my invention.

Having thus described my invention, what I claim and desire to secure by Letters Patent of the United States, is:—

1. In a hub odometer the combination with an axle, a hub and a hub-cap, said hub-cap being mounted over the end of said axle and hub, and having a wall inclosing the end of said axle and hub, the wall of said hub-cap having a hole substantially opposite the end of said axle; of a plug fitting within said hole from the inside of said hub-cap, a seat and flange upon said plug seating said plug in said hole, a spindle journaled in said plug, a cyclometer carried by said spindle, means for operating said cyclometer, said means being mounted upon an extension of said plug, means for restraining said spindle from free rotation relative to said axle, screw threads upon the periphery of said plug; a cap fitting over said plug from the outside of said hub-cap, screw threads at one end of said cap for engaging the said screw threads of said plug, a wall at the other end of said cap, said wall having a window closed by a transparent medium substantially opposite the end of said axle; and means applied from the inside of said hub-cap for locking said plug, said cap and said hub-cap together in place, substantially as described.

2. In a hub odometer the combination with an axle, a hub and a hub-cap, said hub-cap being mounted over the end of said axle and hub, and having a wall inclosing axle and hub, and having a wall inclosing the end of said axle and hub, the wall of said hub-cap having a hole substantially opposite the end of said axle; of a plug fitting within said hole from the inside of said hub-cap, a seat and flange upon said plug seating said plug in said hole, screw threads upon the periphery of said plug; a cap fitting over said plug from the outside of said hub-cap, screw threads at one end of said cap for engaging the said screw threads of said plug, a wall at the other end of said cap, said wall having a window closed by a transparent medium substantially opposite the end of said axle; and means applied from the inside of said hub-cap for locking said plug, said cap and said hub-cap together in place, substantially as described.

In testimony whereof, I affix my signature, in presence of two witnesses.

HARRY P. C. BROWNE.

Witnesses:
SIGMUND LOWENSTEIN,
JOHN M. CHADERTON.